United States Patent Office 3,732,084
Patented May 8, 1973

1

3,732,084
EMULSIFIED CARBON FUEL
James Nixon and Alan Beerbower, Westfield, N.J., assignors to Esso Research and Engineering Company
No Drawing. Filed June 16, 1969, Ser. No. 833,661
Int. Cl. C10l 1/32
U.S. Cl. 44—51    11 Claims

ABSTRACT OF THE DISCLOSURE

A stable, semi-solid or pseudoplastic emulsion containing unusually high amounts, e.g. 60 wt. percent of elemental carbon is prepared by coating finely-divided carbon with an emulsifier and thereafter admixing the emulsifier-coated carbon particles with a liquid hydrocarbon, an emulsifier, and a polar organic liquid to form an emulsified carbon fuel having as the dispersed phase a major proportion of the hydrocarbon, e.g. jet fuel, and as the continuous phase a minor proportion of the polar organic liquid, e.g. formamide-urea mixtures. Such fuels typically have yield stresses in the range of 1,000–10,000 dynes/cm.$^2$, are readily pumpable and are useful as fuels in air-breathing rockets.

BACKGROUND OF THE INVENTION

Field of the invention

This invention relates to stable, semi-solid or pseudoplastic emulsions containing a high level of finely-divided carbon. More particularly, the invention relates to emulsified carbon-containing fuels which are prepared by coating carbon particles with an emulsifier prior to incorporation of the carbon into a pseudoplastic emulsion having as the dispersed phase a major proportion of a liquid hydrocarbon and having as the continuous phase a minor proportion of a polar organic liquid.

Description of the prior art

In volume-limited air-breathing rockets it is desirable to use a fuel which has a high density. With such a fuel for a given volume it is then possible to increase the range and/or payload of the rocket significantly. The approach used in the past was to incorporate metals, e.g. boron and aluminum, into the fuel. This is usually done by incorporating the metal into the gelled or emulsified fuel to prevent settling. Such systems, however, have several drawbacks: (1) such fuels tend to form oxide deposits on the nozzle and thereby decrease rocket efficiency; (2) the metals are quite abrasive to the engine nozzle and thereby decrease nozzle life and operating efficiency; (3) the rocket plumes resulting from combusting the metals are easily spotted by I.R. detecting sensing devices and the rockets can be easily destroyed; and (4) the metals have tended to be slow in combustion, resulting in actual efficiencies below theoretical. Many of the problems cited above could be eliminated by the use of carbon-containing emulsified fuels.

It has previously been known to prepare carbon-containing emulsions of liquid hydrocarbons. Such emulsions have usually contained a maximum of no more than about 20% by weight of elemental carbon and no more than about 60 to 70% by weight of hydrocarbon as the dispersed phase. Emulsions that have been prepared with higher hydrocarbon contents have usually had the hydrocarbon as the continuous phase. Such an emulsion would not be of any particular value in providing a high density non-settling fuel since an emulsion in which the hydrocarbon is the continuous phase would not be sufficiently more viscous than the hydrocarbon itself.

Although in some instances it has been possible to prepare hydrocarbon emulsions of high elemental carbon content (20 wt. percent or more) and high liquid hydrocarbon content (90% or more) as the dispersed phase, such emulsions have usually not possessed satisfactory stability against separation of a liquid hydrocarbon phase. The emulsions prepared in accordance with the present invention are more stable than the prior art emulsions containing high levels of carbon and having a high liquid hydrocarbon content as the continuous phase. Also, since it is possible to prepare a composition in which essentially all of the components are combustible, there is essentially no loss in the heating value of the hydrocarbon in such a composition as compared with the non-emulsified hydrocarbon. Furthermore, in those embodiments in which there is no water present, the corrosion problem that has been previously encountered with aqueous emulsions is eliminated. In fact, even in embodiments in which the total water content does not exceed 0.5 to 1.0 wt. percent the corrosion problem is either essentially non-existent, or at the very minimum very largely eliminated.

SUMMARY OF THE INVENTION

In accordance with the present invention, it has now been found that high density fuels having a high degree of stability can be prepared by forming an emulsion containing finely-divided carbon, a liquid hydrocarbon as the dispersed phase and a polar organic liquid as the continuous phase together with a small amount of at least one organic emulsifier. Typically, the emulsion will have a yield stress greater than about 1000 dynes per square centimeter (as measured by the ASTM D–217 Penetrometer, or by equivalent means or methods such as the ASTM D–1092 Viscometer extrapolated back to zero rate of shear, or the rising sphere yield stress method MIL–P–27421) and may be readily pumped by ordinary vane or gear pumps. In a preferred embodiment, the carbon-containing emulsion of the invention will have a yield stress within the range between about 1000 and 10,000 dynes per square centimeter. As described more fully hereinafter, the emulsion is preferably prepared by coating finely-divided carbon with an emulsifier prior to admixture of the carbon with the liquid hydrocarbon and polar organic liquid.

The polar organic liquids that are employed as the continuous phase can be characterized as those having dielectric constants greater than 25 and solubility parameters greater than 10. Representative materials include formamide, dimethyl acetamide, diethyl formamide, dimethyl sulfoxide, propylene carbonate, glycidol, ethylene glycol, dimethyl formamide, and combinations thereof. Although it is not a critical feature of the invention, there is some advantage in having the freezing point of the continuous phase being not much above 40° F. so that the emulsion will be stable at relatively low temperatures.

Tabulated below are the characteristics of some of the polar materials that are suitable for use as the continuous or dispersing phase of the emulsions of this invention. For comparison, the properties of water and of petroleum hydrocarbon jet fuel are also given in the tabulation.

| Substance | Freezing point, °F | Boiling point, °F | Dielectric constant | Solubility parameter [1] |
| --- | --- | --- | --- | --- |
| Formamide | 32 | 451 | 109 | 18 |
| Dimethyl formamide | −70 | 392 | 37 | 12 |
| Dimethyl sulfoxide | 65 | 365 | 45 | 13 |
| Formic acid | 47 | 213 | 58 | 12.1 |
| Glycerol | [2] 32 | 564 | 45 | 16.5 |
| Ethylene glycol | 1 | 387 | 41 | 14.2 |
| JP–4 Jet fuel | <−70 | [3] 140 | 2 | 7 |
| Water | 32 | 212 | 80 | 23.4 |
| Tetrahydrocyclopentadiene dimer (T.H. dimer) | −20 | [3] 410 |  | ~7.5 |

[1] Calculated as square root of energy of vaporization per unit volume, $\sqrt{Ng. \text{ cal/cc.}}$ by method of J. H. Hioldebrand "Solubility of Non-Electrolytes," 3d edition, Reinhold Publishing Corporation, New York, 1950.
[2] Crystallizes slowly at this temperature; melting point of crystals is higher.
[3] Initial boiling point.

It is, of course, necessary that the continuous phase liquid be essentially immiscible with the liquid hydrocarbon.

Formamide is one substance that is preferred as the continuous phase material for use in this invention because it permits the preparation of an essentially water-free emulsion. With a number of the other continuous phase materials coming within the scope of the invention, it is necessary to have some water present.

In the case of formamide, low temperature stability can be improved by employing mixtures of formamide with certain solid amides, provided the mixtures are still liquid at ambient temperatures. The solid amides are characterized as those having from one to three carbon atoms, two amino groups and zero to two imino groups. Such solid amides include urea, oxamide, and guanidine. Usually, in these mixtures from 50 to 85% of the mixture will be formamide and the balance of the mixture will be one or more of the solid amides.

In the case of ethylene glycol, propylene glycol and glycerol, it is possible to eliminate the need for water in making a stable emulsion by employing a mixture of the glycol or glycerol with from 5 to 30% of urea, or preferably with from 10 to 20% of urea. Also, water-free emulsions can be prepared using a mixture of from 60 to 90% formamide and from 10 to 40% of ethylene glycol. Other completely non-aqueous emulsions in which a glycol or glycerol is employed as the continuous phase are possible by substituting for the water small proportions of a $C_8$ to $C_{18}$ fatty alcohol or fatty acid, e.g. lauryl alcohol.

The hydrocarbons that form the dispersed phase in the emulsions of the present invention include those boiling within the range of about 70° to 750° F., e.g. petroleum fractions, such as gas oils, kerosene, motor gasoline, aviation gasoline, aviation turbo jet fuels, diesel fuels, Stoddard solvent, and the like, as well as coal tar hydrocarbons such as coal tar solvent naphtha, benzene, xylene, hydrocarbon fuels from coal gasification, shale oil distillates, and the like. Gasoline is defined as a mixture of liquid hydrocarbons having an initial boiling point in the range of about 70° to 135° F. and a final boiling point in the range of about 250° to 450° F. Most usually gasolines are identified as either motor gasolines or aviation gasolines. Motor gasolines normally have boiling ranges between about 70° to 450° F., while aviation gasolines have narrower boiling ranges between about 100° and 330° F. Gasolines are composed of a mixture of various types of hydrocarbons, including aromatics, olefins, paraffins, isoparaffins, and naphthenes. Stoddard solvent generally has a boiling range of about 300° to 400° F. Diesel fuels include those defined by ASTM Specification D–975–53T. Jet fuels generally have boiling ranges within the limits of about 150° to 600° F. Jet fuels are usually designated by the terms JP–4, JP–5, or JP–6. JP–4 and JP–5 fuels are defined by U.S. Military Specification MIL–T–5624–G. Aviation turbine fuels boiling in the range of 200° to 550° F. are defined by ASTM Specification D–1655–59T. The following are the characteristics of a typical jet fuel:

JP–4 FUEL

Reid vapor pressure, 220; API gravity, 53.5; freezing point (max.), −76° F.

ASTM D–86 distillation (° F.):
```
IBP  _____  140
10%  _____  251
20%  _____  278
30%  _____  300
50%  _____  326
80%  _____  383
95%  _____  445
EP   _____  473
```

A non-metal-containing emulsifier is preferred in the practice of this invention. The best balance of forces of attraction between the hydrocarbon phase and the continuous phase of the emulsion is obtained by using a combination of two or more emulsifiers. For most satisfactory results, the lipophilic portion of the emulsifier must closely match the particular hydrocarbon or hydrocarbon fraction being dispersed. To attain the proper balance between lipophilic and non-lipophilic (i.e. hydrophilic) forces in the emulsifier system, it is convenient to use the scale of HLB values known to the emulsifier art. These are discussed by W. C. Griffin in the Journal of the Society of Cosmetic Chemistry, December 1948; page 419; also in Kirk-Othmer Encyclopedia of Chemical Technology, second edition, volume 8, pages 131–133 (1965). Desired HLB values can be obtained by using two or more emulsifiers in combination. Briefly, HLB is number is ascertained by dividing the molecular weight of the hydrophilic compounds employed in the synthesis of a given compound by the molecular weight of that compound and multiplying the result by 20. In situations where a plurality of materials are employed in the dispersant system, the HLB number for the total system is the summation of the HLB numbers of the individual components multiplied by the weight percent of that particular component of the total dispersant system.

Emulsifiers and emulsifier combinations which give HLB values in the range of 11–16 are satisfactory for producing a stable emulsion in the present invention. Formamide gives an even greater latitude in the selection of emulsifiers that may be used. This is believed to be because of the strong hydrogen bonding and/or polar forces in formamide. Mixtures of formamide and solid amides such as urea appear to give the most satisfactory emulsions when using non-ionic emulsifiers having HLB values in the 11–14 range. With polar organic liquids within the scope of this invention that are used in conjunction with amides or with small amounts of water, such as ethylene glycol, the effective HLB value will depend on the particular liquid selected and will vary with the proportion of water or amide to the said organic liquid constituting the continuous phase.

Among the surfactants or emulsifiers that may be employed in the present invention ere included alkylphenyl polyethylene glycol ethers such as Tergitol NPX of Carbide and Carbon Company; polyethylene polyoxypropylene glycol such as Pluronic L-64 of Wyandotte Chemical Company; rosin acid esters of polyoxyethylene glycol such as Ethofat 242/25 of Armour Industrial Chemical Company; and alkylphenyl polyethoxy alkanols, such as Triton X-102 which is iso-octyl phenyl polyethoxy ethanol, i.e. the reaction product of iso-octylphenol and ethylene oxide. The alkyl phenyl polyalkoxy alkanols are obtained by reacting 5 to 15 molar proportions of a $C_2$ to $C_3$ alkylene oxide with one molar proportion of an alkyl phenol having a $C_5$ to $C_{12}$ alkyl group, e.g. the reaction product of 6 moles of propylene oxide with one mole of dodecyl phenol, the reaction product of a mixture of 5 moles of ethylene oxide and 5 moles of propylene oxide with one mole of nonyl phenol, and the reaction product of 8 to 10 moles of ethylene oxide with one mole of iso-octyl phenol. These are included within a broader class of materials having the formulae:

$$RA(CH_2CH_2O)_xCH_2CH_2OH$$

or $$RA(CH_2CH_2CH_2O)_xCH_2CH_2CH_2OH$$

where R is a $C_8$ to $C_{18}$ hydrocarbon group, A is oxygen or sulfur and $x$ is 5 to 20.

Other emulsifiers include the fatty acid esters of sorbitan, such as sorbitan monolaurate, sorbitan monostearate, sorbitan monopalmitate and the alkoxylated fatty acid esters of sorbitan such as polyoxyethylene sorbitan monostearate, tristearate or trioleate. The various sorbitan esters of fatty acids are well known to the art as Spans, and the polyoxyethylene derivatives of the sorbitan esters of fatty acids are well known as Tweens. Still other suitable emulsifiers include N-alkyl trimethylene diamine dioleate of Armour and Company, octakis (2-hydroxy propyl) sucrose, the condensation products of fatty acid amides and ethylene oxide, the ethoxylated fatty alcohols, polyoxyethylene monostearate, polyoxyethylene monolaurate, propylene glycol mono-oleate, glycerol monostearate, ethanolamine fatty acid salts, stearyl dimethyl benzene ammonium chloride, various gums such as gum tragacanth, gum acacia, etc. Where the presence of metal is not objectionable in the emulsion, metal-containing emulsifiers can also be used, such as sodium dioctyl sulfosuccinate (Aerosol OT) or disodium N-octadecyl sulfosuccinamate (Aerosol 18).

An extensive list of emulsifiers together with their HLB values is given in Kirk-Othmer Encyclopedia of Chemical Technology, second edition, vol. 8, pages 128-130 (1965). From this list it is possible to select those that either alone or in admixture will give an HLB value suitable for use in the present invention.

The finely-divided carbon particles which are employed in the emulsion of this invention generally have a particle size less than 0.5 micron. It is preferred, however, that the finely-divided carbon have a particle size less than about 0.3 micron, e.g. 0.10 to 0.20 micron.

The emulsified carbon fuel of the present invention will contain the following broad and preferred ranges of components:

| Component | Concentration, weight percent | | |
|---|---|---|---|
| | Broad | Preferred | Most preferred |
| Finely-divided carbon | 0.1 to 68 | 20 to 68 | 30 to 60. |
| Hydrocarbon (dispersed phase) | 25 to 98.9 | 25 to 78 | 33 to 60. |
| Polar organic liquid (continuous phase) | 0.5 to 20 | 1.5 to 10 | 2 to 6. |
| Emulsifier | 0.5 to 10 | 0.5 to 5 | 1 to 2. |

In the cases where water is employed in the continuous phase the component ranges will be slightly different, i.e.

| Component | Concentration, weight percent | | |
|---|---|---|---|
| | Broad | Preferred | Most preferred |
| Finely-divided carbon | 0.1 to 68 | 20 to 68 | 30 to 60. |
| Hydrocarbon (dispersed phase) | 25 to 98.9 | 25 to 78 | 33 to 60. |
| Polar organic liquid | 0.5 to 20 | 1 to 10 | 2 to 5. |
| Water | 0 to 2.0 | 0 to 2.0 | 0.5 to 1. |
| Emulsifier | 0.5 to 10 | 0.5 to 5 | 1 to 2. |

In one embodiment of the invention, it has been unexpectedly found that unusually large portions, e.g. 60 wt. percent, of finely-divided carbon can be incorporated into the emulsion when the carbon particles are precoated with at least one of the aforedescribed emulsifiers. Thus, if the carbon is not pretreated, i.e. precoated with an emulsifier, only about 20 wt. percent of elemental carbon can be incorporated to form a stable carbon-containing emulsion whereas as much as 60 wt. percent of the emulsion can be comprised of elemental carbon when the carbon is coated prior to contact with the aforedescribed liquid hydrocarbons and polar organic liquids.

The carbon particles may be precoated with the emulsifier in several ways and the particular method employed is unimportant provided that a film of emulsifier is deposited on at least a portion of the surface area of the carbon particles. The amount of emulsifier deposited on the carbon surface is a matter of choice and the amount of carbon which can be incorporated into the emulsion of the invention is a function of the proportion of the carbon surface precoated with the emulsifier, i.e., as the surface area which is covered with emulsifier is increased the amount of carbon which can be used to form a stable emulsion is also increased. A convenient method of coating the carbon particles is as follows: carbon particles (e.g. 0.3 micron-0.5 micron, preferably 0.10-0.20 micron, particle size) are contacted with at least one of the aforedescribed emulsifiers dissolved in some solvent (e.g. JP-4 fuel, kerosene, T. H. Dimer, xylene, etc.) at ambient or moderate temperatures (e.g. 50°-80° F.) to form a slurry which is stirred for a period of time to effect the desired proportion of carbon surface area to be coated (usually 20 to 30 minutes). Typically, the amount of emulsifier used in precoating the elemental carbon particles will range from about 2 pounds of emulsifier per 100 pounds of elemental carbon to about 8 pounds of emulsifier per 100 pounds of elemental carbon. Particularly good results are achieved when the amount of emulsifier used to precoat the carbon is in the range of 3-6 pounds of emulsifier per 100 pounds of elemental carbon. The mixture is then vacuum filtered and the coated carbon particles are heated at 250° F. to remove the remaining solvent. The resultant emulsifier-coated carbon is then preferably pulverized and sieved through a screen to produce a sufficiently small particle size such as those passing a 24 mesh, preferably 100 mesh, screen (U.S. Sieve Number).

Another carbon pretreatment procedure involves the formation of a carbon slurry in the hydrocarbon containing at least one of the aforedescribed emulsifiers. The slurry is then admixed with sufficient polar organic liquid to form an emulsion containing the carbon (e.g. 20 wt. percent carbon). The resultant emulsion is then vigorously stirred until it is broken and the carbon which settles out is recovered by filtration and stripping of the solvent. The emulsifier-coated carbon is then sieved as above in order to produce the desired particle size.

To form the final emulsion, the pretreated or precoated finely-divided carbon is preferably added to the hydrocarbon along with at least one of the aforedescribed emulsifiers (which may or may not be the same emulsifier used to coat the carbon) to form a slurry which is then added to the polar organic liquid with stirring to produce the emulsion of the invention.

The nature of the invention will be more fully understood when reference is made to the following examples.

possible to prepare stable emulsions containing more than about 20 wt. percent elemental carbon.

TABLE I

| Component | Weight percent of component in emulsion— | | | | | | |
|---|---|---|---|---|---|---|---|
| | I | II | III | IV | V | VI | VII |
| Emulsifier-coated carbon black | 30.0 | 30.0 | 30.0 | 35.0 | 35.0 | 60.0 | 60.0 |
| Fuel dispersed phase: | | | | | | | |
| T. H. dimer fuel [1] | 63.4 | 63.4 | | | | | 32.4 |
| JP-4 | | | 63.4 | 60.0 | 60.0 | 32.4 | |
| Emulsifier: | | | | | | | |
| Ethoxylated sorbitol ester [2] | 0.60 | 1.20 | 1.2 | 0.75 | | 1.2 | 1.2 |
| Ethoxylated tridecyl alcohol [3] | 0.40 | 0.80 | 0.80 | | | 0.80 | 0.80 |
| Hydrazine salt of DDSA [4] | 0.20 | 0.20 | 0.20 | | | 0.20 | 0.20 |
| Ethoxylated tridecyl alcohol [5] | | | | 0.25 | | | |
| Polyoxyethylene sorbitan monooleate [6] | | | | | 0.14 | | |
| Sorbitan monooleate [7] | | | | | 0.36 | | |
| Polar continuous phase: | | | | | | | |
| 20 wt. percent urea in formamide | 4.90 | 3.90 | 3.90 | 3.50 | | 4.90 | 4.90 |
| Formamide | | | | | 4.00 | | |
| Water | 0.50 | 0.50 | 0.50 | 0.50 | 0.50 | 0.50 | 0.50 |
| Total | 100.00 | 100.00 | 100.00 | 100.00 | 100.00 | 100.00 | 100.00 |

[1] Tetrahydrocyclopentadiene dimer.
[2] Available as Atlas IL-851 from Atlas Chemical Industries, Inc.
[3] A condensation product of 8 moles of ethylene oxide per mole of tridecyl alcohol.
[4] A condensation product of 1 mole of hydrazine per mole of dodecyl succinic anhydride.
[5] A condensation product of 12 moles of ethylene oxide per mole of tridecyl alcohol.
[6] Available as Tween 80 from Atlas Chemical Industries, Inc.
[7] Available as Span 80 from Atlas Chemical Industries, Inc.

DESCRIPTION OF THE PREFERRED EMBODIMENTS

A number of emulsions having the compositions shown in the following table were prepared and tested. In these emulsions, the carbon black which was incorporated into the final emulsion was pretreated by coating with emulsifiers in the following manner. In each pretreating step, 1800 grams of carbon black (0.25 micron average particle size) were added to 1035 grams of a solution consisting of 94 wt. percent of fuel and 6 wt. percent of an emusifier consisting of the emulsifiers employed in the final emulsion and in the relative proportions set forth in the following table. For example, the carbon black incorporated into Emulsion V was contacted with JP-4 fuel containing an emulsifier consisting of Tween 80 and Span 80 present in a weight ratio of 36:14. After mixing the carbon black, fuel and emulsifiers for about 20 minutes at room temperature, the mixture was then filtered to isolate the resulting emulsifier-coated carbon black which was then heated at about 250° F. and atmospheric pressure to remove the fuel solvent. The coated carbon black was then pulverized to pass a 60 mesh screen (U.S. Sieve Number) prior to its admixture with the other components of the emulsion. The emulsions set forth in the following table were then prepared by adding at room temperature a mixture of the precoated carbon black, fuel and emulsifier over a period of 30 to 60 minutes to the continuous phase material contained in a vessel agitated with a paddle type low-speed stirrer. As shown in the following table, the resulting emulsions contained about 30 to 60 wt. percent carbon black. However, when not employing emulsion-coated carbon black, it was not The emulsions prepared above were evaluated to determine their suitability as fuels. The results given below in Table II show that the emulsions of this invention are highly stable fuels having a high fuel value per unit volume and a reduced tendency to settle or to flow under low shearing forces.

TABLE II

| | Properties of emulsified carbon fuels | | | | | |
|---|---|---|---|---|---|---|
| | Stability (wt. percent separation) | | | | | Gross heat of combustion,[4] b.t.u./lb. |
| Emulsion [1] | 8 hours vibration [2] | 1 week at 140° F.[2] | 1 week at −65° F.[2] | Yield stress [3] dynes/cm.[2] | Density, g./cc. | |
| I | 0.0 | 0.0 | 0.0 | 1,250 | 1.14 | 16,953 |
| II | 0.0 | 0.0 | 0.0 | 2,800 | 1.14 | 16,953 |
| III | 0.0 | 0.0 | 0.0 | 8,100 | 0.966 | 17,016 |
| IV | 0.0 | 0.0 | 0.0 | 1,375 | | |
| V | 0.0 | 0.0 | 0.0 | 1,150 | 1.01 | |
| VI | 0.0 | 0.0 | 0.0 | 710,000 | 1.30 | 15,806 |
| VII | 0.0 | 0.0 | 0.0 | 710,000 | 1.45 | 15,560 |

[1] 350 g. of emulsion placed in glass cylindrical container approximately 3½ inches in diameter and 6 inches in height and vibrated for 8 hours at 360 cycles/minute developing a force about 2 g's at the end of each stroke.
[2] Emulsions stored at indicated temperature for 1 week.
[3] As measured by the ASTM D-217 Penetrometer Test Method.
[4] As measured by ASTM D-240 Test Method.

It is not intended that this invention be limited to the specific examples presented by way of illustration. The scope of the invention is limited only by the appended claims.

What is claimed is:

1. A stable pseudoplastic emulsion of high carbon content which comprises at a dispersed phase from about 25 wt. percent to about 98.9 wt. percent of a liquid hydrocarbon boiling within the range of 70° to 750° F.; from about 0.5 to 20 wt. percent of a polar organic liquid as the continuous phase; from about 0.5 to about 10 wt. percent of an organic emulsifier capable of forming said emulsion; and up to 68 wt. percent of finely divided carbon, said polar organic liquid being selected from the group consisting of formamide; a mixture of formamide with a solid amide having from 1 to 3 carbon atoms, 2 amino groups and 0 to 2 imino groups; a mixture of formamide with ethylene glycol; and a mixture of urea with ethylene glycol, propylene glycol, or glycerol.

2. The emulsion of claim 1, having a yield stress in excess of about 1000 dynes/square centimeter.

3. The emulsion of claim 1 wherein the amount of hydrocarbon ranges from 25 to 68 wt. percent, the amount of polar organic liquid ranges from 1.5 to 10 wt. percent, the amount of emulsifier ranges from 0.5 to 5 wt. percent and the amount of finely-divided carbon ranges from 20 to 68 wt. percent.

4. The emulsion as defined by claim 1 wherein said emulsifier has an HLB value in the range of about 11 to 16.

5. The emulsion of claim 1, having a yield stress in excess of about 3000 dynes/square centimeter.

6. The emulsion of claim 1, wherein the amount of hydrocarbon ranges from 33 to 60 wt. percent, the amount of polar organic liquid ranges from 2 to 6 wt. percent, the amount of emulsifier ranges from 1 to 2 wt. percent and the amount of finely-divided carbon ranges from 30 to 60 wt. percent.

7. The emulsion as defined by claim 1 wherein said polar organic liquid is a liquid mixture of from 50 to 85 wt. percent of formamide with from 15 to 50 wt. percent of a solid amide from the group consisting of urea, oxamide, and guanidine.

8. The emulsion of claim 1 wherein said polar liquid is formamide.

9. The emulsion of claim 1 wherein said polar liquid is a mixture of urea and formamide.

10. A processes for preparing a stable pseudoplastic emulsion having a high carbon content which comprises:

(a) contacting solid carbon particles with an emulsifier having an HLB value greater than 11 to form carbon particles having a coating of said emulsifier; and (b) admixing said emulsifier-coated carbon particles with a hydrocarbon, a polar organic liquid and an emulsifier to form the emulsion defined by claim 1.

11. A process as defined by claim 10 wherein said carbon particles are coated with emulsifier by contacting said particles with a solution of emulsifier, thereafter removing solvent, and then pulverizing the solvent-free emulsifier-coated carbon.

References Cited

UNITED STATES PATENTS

| | | | |
|---|---|---|---|
| 2,938,779 | 5/1960 | Kolfenbach | 44—7 D |
| 3,352,109 | 11/1967 | Lissant | 60—219 X |
| 3,458,294 | 7/1969 | Nixon et al. | 44—51 |

BENJAMIN R. PADGETT, Primary Examiner

U.S. Cl. X.R.

60—215, 219; 149—6, 109